United States Patent [19]

Duval et al.

[11] 4,222,161

[45] Sep. 16, 1980

[54] TOOL FOR FITTING A RESILIENT RING INTO A GROOVE

[75] Inventors: André Duval; Bernard Lime, both of Angers, France

[73] Assignee: Societe Anonyme D.B.A., Paris, France

[21] Appl. No.: 910,551

[22] Filed: May 30, 1978

[30] Foreign Application Priority Data

Jul. 8, 1977 [FR] France .................................. 77 21115

[51] Int. Cl.³ ............................................ B23P 19/02
[52] U.S. Cl. ......................................... 29/235; 29/451
[58] Field of Search .................. 29/235, 229, 450, 451

[56] References Cited

U.S. PATENT DOCUMENTS

| 3,406,441 | 10/1968 | Larsson | 29/235 X |
| 3,455,011 | 7/1969 | Harding | 29/235 |
| 3,851,369 | 12/1974 | Eschholz | 29/235 |

FOREIGN PATENT DOCUMENTS 2444896 4/1975 Fed. Rep. of Germany ............. 29/235

Primary Examiner—Othell M. Simpson
Assistant Examiner—Roscoe V. Parker
Attorney, Agent, or Firm—Paul David Schoenle; Ken C. Decker

[57] ABSTRACT

A tool comprising a receptacle having a cylindrical portion defining a space therewithin adapted to receive a resilient seal after deformation of the latter by an external member is disclosed. A movable member carried by said receptacle comprises a tubular portion slidably received on the cylindrical portion and movable from a first position in which said tubular portion is opposite the space towards a second position in which said tubular portion is offset relative to the space against the action of a first spring. The tubular member is provided with an aperture adapted to receive the external member, and an element is slidably carried in said space and resiliently urged away from the latter by a pair of second springs, thereby expulsing the seal in a corresponding groove when the tubular member is moved towards its second position.

7 Claims, 6 Drawing Figures

TOOL FOR FITTING A RESILIENT RING INTO A GROOVE

The invention relates to a tool for fitting a ring seal into a groove defined in a bore, to an apparatus using a tool of this kind, and to the corresponding fitting method.

Hydraulic devices in industry are generally equipped with ring seals so that chambers for receiving hydraulic fluid can be cut off from one another and from the outside. These seals are usually made of rubber or flexible synthetic plastic material and are exposed in use to very varied and difficult conditions, demanding complete fluid-tightness. The fitting of seals of this type is therefore a particularly delicate operation which must be performed without stretching or damaging the seal, for example owing to friction. Also, the seal must be correctly positioned to prevent leakage, for example due to a seal which has twisted inside its groove.

Because the fitting of seals is critical, it is still usually done manually, which leads to an appreciable increase in the time taken to manufacture devices equipped with seals and to a relatively high failure rate due to incorrect placing of the seal.

The main object of the invention is to overcome these disadvantages by means of a tool permitting automatic fitting of a ring seal of any cross section into a groove without stretching or damaging the seal.

According to the invention, a tool for fitting a ring seal into a groove defined in a bore is characterized in that it comprises a receptacle having a cylindrical portion in which there is defined a space capable of receiving the seal after the latter has been deformed inwards by at least one external member, the diameter of the cylindrical portion being greater than the maximum external dimensions of the seal after deformation and smaller than the diameter of the bore, the tool also comprising a movable member having a tubular portion slidable on the cylindrical portion and normally urged opposite the space by first resilient means, at least one aperture being formed in at least one of the said portions to allow the external member to pass through when the cylindrical portion is opposite the space.

According to another feature of the invention, expulsion means may be provided in the space to urge the seal into its natural annular position when the tubular portion is offset relative to the space, the said resilient means being counteracted.

The invention also relates to apparatus for fitting an annular seal into a groove defined in a bore, characterized in that it comprises means for urging the tubular portion of a tool embodying the invention, clear of the space, counteracting the first resilient means, means for placing a ring seal opposite the space, means for urging the seal into the space by way of the external member, means for bringing the tool opposite the bore, and means for urging the receptacle into the bore.

In addition, the invention relates to a method of fitting a ring seal into a groove defined in a bore, characterized in that it comprises the following steps:

(a) uncovering of the space defined in the cylindrical portion of a tool embodying the invention;
(b) insertion and maintenance of the seal into the space by means of the external member;
(c) covering of the seal with the tubular portion of the tool;
(d) removal of the external member;
(e) bringing the assembly comprising the tool and seal opposite the bore;
(f) introduction of the cylindrical portion of the tool into the bore and expulsion of the seal into the groove by shifting the movable member against the action of the first resilient means;
(g) retraction of the tool out of the bore.

The invention will now be described, by way of example, with reference to the accompanying drawings, in which.

Figure 2:
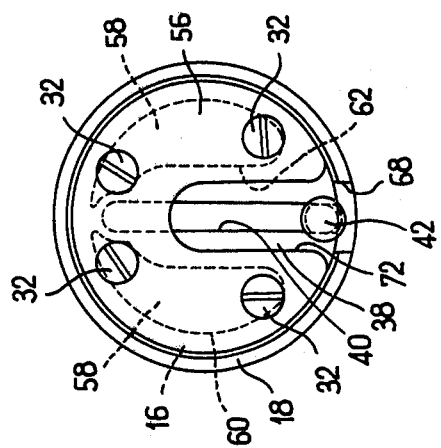
FIG. 2 is a top view of the tool shown in FIG. 1.
Figure 3:
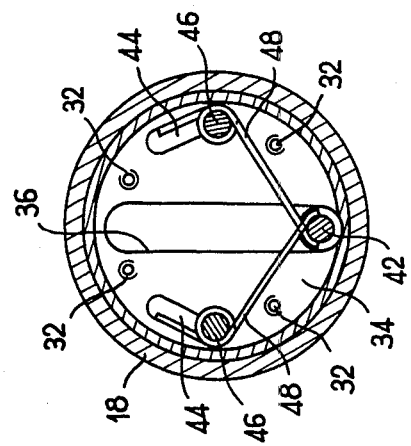
FIG. 3 is a cross-section taken along a line 3—3 in FIG. 1.
Figure 1:
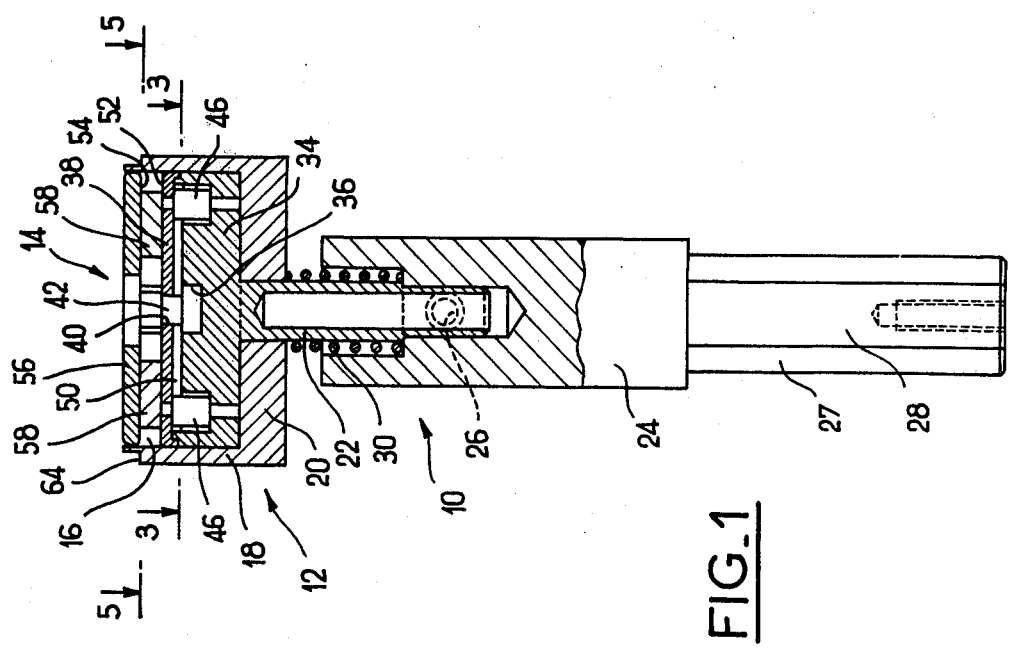
FIG. 1 is a longitudinal view, partly cut away, of a tool embodying the present invention.

The fitting tool illustrated in FIGS. 1 to 3 essentially comprises a receptacle generally designated 10 and a movable member generally designated 12. The receptacle 10 has at the top, viewing FIG. 1, a cylindrical portion generally designated 14, defining a substantially annular space 16 which in the embodiment illustrated is intended to receive a seal of square cross-section. The movable member 12 essentially comprises a tubular portion 18, slidable on the cylindrical portion 14, and a radial portion 20. A rod 22 extends from the cylindrical portion 14 of the receptacle 10 and freely crosses through the radial portion 20. The free end of the rod 22 is attached to a tool holder 24 by appropriate means such as, for example, a center screw 26. The tool holder 24 is equipped at its free end with a cylindrical portion 27 adapted to be received in a bore 88 in the fitting apparatus shown in FIG. 4 and which preferably bears a flat 28 to define the orientation of the tool holder 24 and the radial portion 20 of the movable member 12, so as to urge the inside surface of the portion 20 on to the cylindrical portion 14. In this position, the tubular portion 18 covers the cylindrical portion 14 over substantially all its height, particularly at the level of the space 16. However, the range of motion permitted between the movable member 12 and the tool holder 24 in opposition to the spring 30 is enough to allow the tubular portion 18 to uncover the space 16 completely.

As shown in FIGS. 1 to 3, the cylindrical portion 14 of the receptacle 10 comprises various parts releasably connected by four screws 32 in the embodiment illustrated. A first part 34 of the cylindrical portion 14 is integral with the rod 22 and defines a substantially straight groove or slot 36 running approximately diametrically across the part 34. A second part 38 of the cylindrical portion 14 of the receptacle 10 is above the part 34 in FIG. 1 and also defines a straight slot 40, narrower than the slot 36 and opposite the latter. The slots 36 and 40 slidably receive a cylindrical element 42 having parts of small and large diameter situated above the part 38 of the cylindrical portion 14, the cylindrical element 42 being installed in conventional manner by means of flats on either of the large-diameter parts.

In addition, the part 34 of the cylindrical portion 14 of the receptacle 10 contains recesses 44 arranged symmetrically relative to the slot 36 and receiving pivot pins 46, the latter bearing hairpin springs 48 of which one end rests on one edge of the recess 44 and of which the other end acts on the small-diameter part of the cylindrical element 42, a gap 50 being defined between the parts 34 and 38 of the cylindrical portion 14 to allow movement of the springs 48. Also, the pivot pins 46 have axial extensions which swivel in the parts 34, 38 of the cylindrical portion 14.

Figure 6:
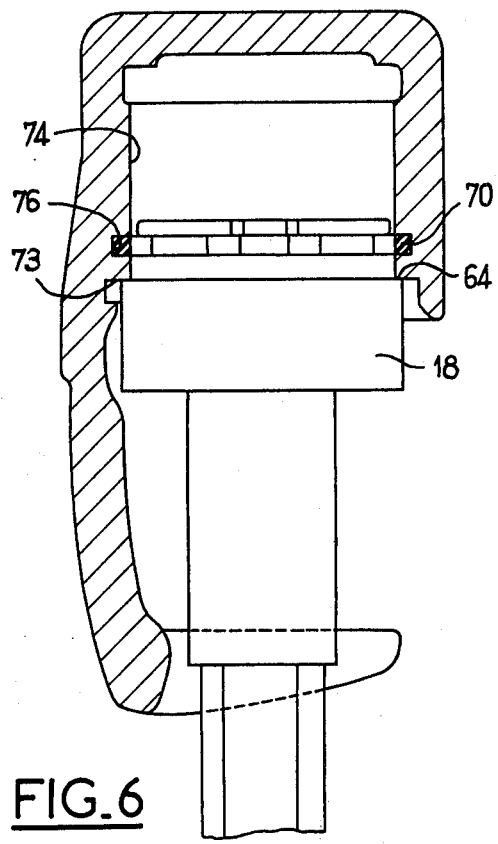
FIG. 6 is a cross-section of a disc brake caliper, illustrating the last step in the fitting of a seal to the hydraulic actuator of the caliper, by means of the tool shown in FIGS. 1 to 3.

The space 16 is defined between the top surface 52 of the part 38 and the underside 54 of a cover 56 separated from the part 38 by spacers 58 defining the bottom of the space 16. The distance separating the top surface 52 of the part 38 from the free end of the tubular portion 18 in the idle position is substantially equal to the range of motion permitted between the movable member 12 and the tool holder 24 in opposition to the spring 30. Consequently, as shown in FIG. 6, the seal 70 can be positioned axially relative to an external reference surface 73 on the hydraulic device which is to receive the seal. As shown best in FIG. 2, the spacers 58 define within the space 16 an annular portion 60 and a U-shaped cavity 62 which extends substantially symmetrically along a diameter of the annular portion 60 and parallel to the slots 36, 40 to near the opposite part of the annular portion 60 of the space 16. Furthermore, the end of the U-shaped portion 62 is rounded to receive the cylindrical element 42 when the latter is urged to the top of the slots 36, 40 in FIGS. 2 and 3, counteracting the springs 48. The portions 60, 62 defined within the space 16 are connected by rounded parts to prevent damage to the seal which will be received in this space.

Lastly, the free end of the tubular portion 18 of the movable member 12 bears a shoulder 64 defined between a large-diameter part of the tubular portion 18 and a smaller diameter part formed on its free end. As will be seen below, the various characteristics relating to the spacing of the surfaces 52 and 54, the depth of the annular portion 60 and cavity 62 and the distance separating the shoulder 64 from the free end of the tubular portion 18 are selected according to the characteristics of the seal to be fitted and the distance separating the groove adapted to receive the seal from the edge of the bore in which said groove is provided.

Figure 5:
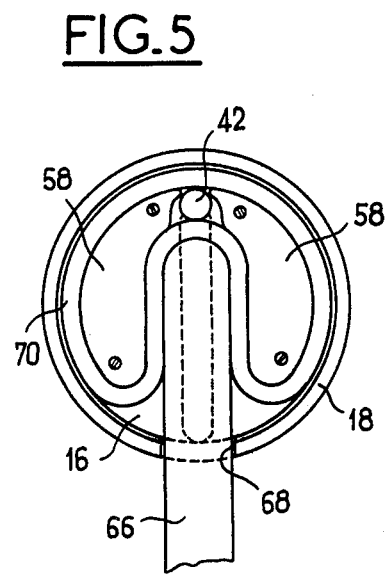
FIG. 5 is a cross-section along a line 5—5 in FIG. 1, showing the fitting tool after insertion of a seal by means of an external member.

The tool just described with reference to FIGS. 1 to 3 operates as follows:

When the tool is idle, its various components occupy the positions illustrated in the Figures. When a seal is to be fitted into a groove in a bore, the movable member 12 is moved downwards in FIG. 1, counteracting the spring 30, until the tubular portion 18 has completely uncovered the space 16. A ring seal 70 is then placed round the cylindrical portion 14 opposite the space and its maximum external dimensions are reduced by means of an external member 66 (FIG. 5), the end of which conforms to the U-shaped portion 62, allowing for the thickness of the seal. The external member 66 can enter through an aperture 68 in the tubular portion 18. The movable member 12 can now resume the position shown in FIG. 1, under the influence of the spring 30, whereupon the seal 70 is trapped in the space 16 as shown in FIG. 5. In this position, the cylindrical element 42 is urged towards the upper end of the slots 36, 40 by the member 66 as shown in FIG. 5. The axial dimensions of the aperture 68, which are not illustrated, are large enough to allow the movable member 12 to return to the position shown in FIG. 1 in spite of the presence of the external member 66. The latter can then be removed without risk of the seal escaping, either through the aperture 68 or through an aperture 72 in the cover 56 as shown in FIG. 2. The tool shown in FIGS. 1 to 3, with the seal 70 fitted to it, can then be brought to the member in which it is to be inserted and placed opposite the bore 74 in the latter as shown in FIG. 6. The shoulder 64 on the tubular portion 18 thus engages the end 73 of the bore 74, so that the tool is centred relative to the bore. The receptacle 10 is urged upwards in FIGS. 1 and 6, counteracting the spring 30, so that the seal 70 is uncovered once it has passed the end of the tubular portion 18. Preferably, the distance from the end of the tubular portion to the shoulder 64 is substantially equal the distance separating the end 73 of the bore 74 from the edge of the groove 76 in the bore. At this instant the tension stored in the seal 70, because it has been deformed relative to its natural shape, and the force exerted by the springs 48 by way of the cylindrical element 42 tend to eject the seal 70 into the bottom of the groove 76 as shown in FIG. 6.

If the distance separating the surfaces 52 and 54 is substantially equal to the thickness of the seal, there is no risk of the seal twisting during fitting. The shape of the bottom of the space 16 is preferably made to conform to the cross-section of seal fitted, so preventing undesirable wear on the seal. For example, the bottom of the space 16 defined by the spacers 58 may be rounded in the case of a tool for fitting O-ring seals.

Figure 4:
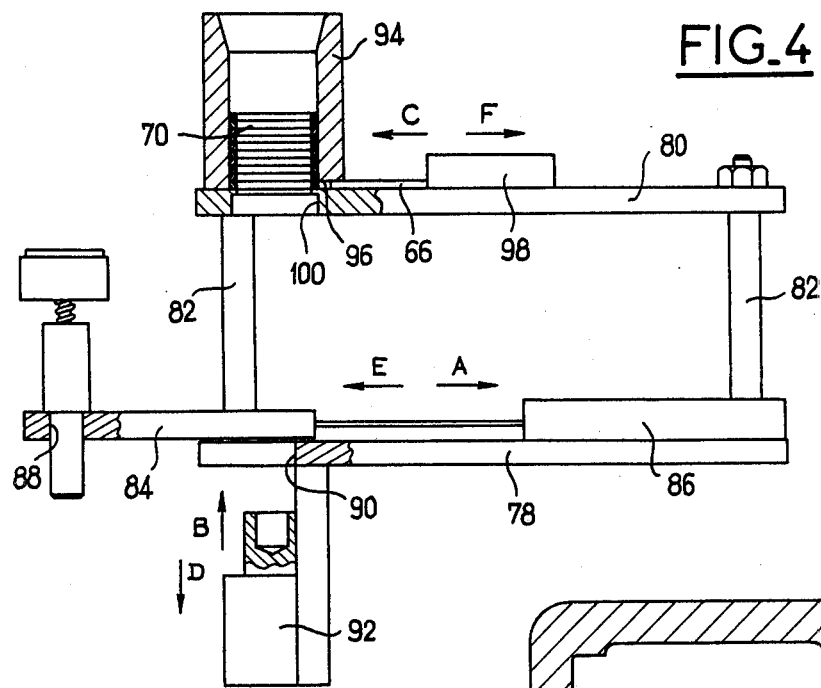
FIG. 4 illustrates a fitting apparatus using a tool as shown in FIGS. 1 to 3.

FIG. 4 shows an apparatus which illustrates diagrammatically the application of the tool shown in FIGS. 1 to 3 to an automatic seal fitting system.

The fitting apparatus shown in FIG. 4 essentially comprises a support formed of two horizontal plates 78, 80 arranged opposite one another and separated, for example, by tie rods 82. The plate 78 slidably supports a plate 84 movable on guides (not shown) by means of a first jack 86. The plate 84 contains a bore 88 receiving a tool similar to that shown in FIGS. 1 to 3. An abutment indicated diagrammatically at 90 is attached to the plate 78 to define the right-hand limit position of the tool viewing FIG. 4. In this position, the tool is aligned with a second jack 92 which can move the tool up and down in FIG. 4, and with a magazine 94 mounted on the plate 80 and containing a stack of seals 70. The latter come to bear one by one on the upper edge of the plate 80, the seal at the bottom of the stack being opposite an aperture 96 formed in the magazine 94 to admit the member 66, which is operated by a third jack 98.

The fitting apparatus illustrated diagrammatically in FIG. 4 operates as follows:

In a first step the various components of the apparatus are in the positions shown in FIG. 4. In a second step the plate 84 is moved as indicated by an arrow A to bring the tool into alignment with the jack 92 and magazine 94, so that the jack 92 can guide the tool in the direction indicated by an arrow B until it centers itself in a bore 100 formed in the plate 80 in the extension of the magazine 94. At this point the tubular portion 18 of the tool is bearing on the plate 80 whereas the receptacle 10 is still urged upwards by the jack 92, so that the space 16 of the tool is uncovered. The jack 98 is now operated as indicated by an arrow C, so that the member 66 enters the space 16 as shown in FIG. 5, introducing a seal 70 into the space. The jack 92 is now moved downwards as indicated by an arrow D so that the tubular portion 18 of the tool, under the influence of the spring 30, covers up the space 16 again, thereby trapping the seal 70 inside the tool. The jacks 86, 98 can now be operated simultaneously as indicated by arrows E, F, returning the various components of the apparatus to the positions shown in FIG. 4, a seal being retained inside the tool. The member to which the seal is to be fitted is now brought above the tool either manually or automatically, so that the operation of fitting the seal into a member, for example a disc brake caliper, can be performed as already described with reference to FIG. 6.

It will be appreciated that the invention is not restricted to the embodiment just described by way of example. In particular, the expulsion means constituted by the springs 48 and cylindrical element 42 may be replaced by any other resilient or mechanical device responsive, for example, to rotation of the tool, and may even be omitted if the seal is resilient enough for it to be expelled automatically. Furthermore, the shape of the space 16 may be modified and may include a plurality of cavities similar to or different from the cavity 62. A plurality of external members comparable to the member 66 will then be required to allow insertion of the seal into the space so defined.

What we claim is:

1. A tool for fitting a ring seal into a groove defined in a bore comprising a receptacle having a cylindrical portion in which there is defined a space capable of receiving the seal, at least one external member cooperating with the seal to deform the seal within the space, the diameter of the cylindrical portion being greater than the maximum external dimensions of the seal after deformation and smaller than the diameter of the bore, the tool also comprising a movable member having a tubular portion slidable on the cylindrical portion and normally urged to a position opposite the space by first resilient means, at least one aperture being formed in at least one of the said portions to allow the external member to pass through when the tubular portion is opposite the space, expulsion means provided in the space to urge the seal into its natural annular position when the tubular portion is offset relative to the space against the action of said resilient means, and said expulsion means includes at least one element slidable in a slot in the cylindrical portion and urged towards an end of said slot by second resilient means.

2. A tool as claimed in claim 1, wherein the second resilient means comprise at least one hairpin spring of which one end bears on an abutment surface defined on the cylindrical portion and the other end bears on the said element.

3. A tool as claimed in claim 2, wherein two hairpin springs are arranged symmetrically relative to the axis of the slot.

4. A tool for fitting a resilient ring into a groove defined in a bore, comprising:

a receptacle having a cylindrical portion and a rod extending axially from said cylindrical portion;

a movable member having a radial portion through which said rod extends and a tubular portion slidably received on said cylindrical portion;

first resilient means provided between said movable member and said receptacle to urge the radial portion of the movable member into engagement with the cylindrical portion of the receptacle;

said cylindrical portion comprising two substantially plane, mutually opposite surfaces separated by a distance substantially equal to the thickness of said ring, said surfaces defining a space adapted to receive the seal when the latter has been deformed;

said space comprising a substantially annular portion and a cavity connected by rounded portions;

the tubular portion of the movable member being opposite the space when the radial portion of the movable member engages the cylindrical portion of the receptacle, said tubular portion being movable to an offset position relative to the space to permit insertion and expulsion of the seal.

5. A tool according to claim 4, wherein the cavity of said space is U-shaped and said cylindrical portion carries an element slidable in a slot extending substantially along the U-shaped cavity of said space, second resilient means urging said element toward one end of said slot.

6. A tool according to claim 5, wherein an aperture is formed in the tubular portion in alignment with the U-shaped cavity of said space to allow an external member to deform the seal inward into said cavity against the action of said second resilient means.

7. A tool permitting automatic fitting of a ring seal into a groove defined at a given distance from an open end of a bore, said tool comprising:

a receptacle having a rod and a cylindrical portion defining a space adapted to receive the seal;

a movable member having a tubular portion slidable on the cylindrical portion, and a radial portion through which extends said rod;

a tool holder attached to said rod; and resilient means provided between the tool holder and the radial portion of the movable member to urge the latter portion toward a first position in which the tubular portion of the movable member is opposite said space to oppose removal of said seal, the movable member being shiftable from said first position toward a second position in which the tubular portion of the movable member is offset relative to the space, the tubular portion of the movable member including an annular abutment surface capable of bearing on the open end of the bore to center the tool relative to the bore, the annular abutment surface including a shoulder defined between a large diameter part and a small diameter part of the tubular portion, the length of said small diameter part being substantially equal to said given distance separating the open end of the bore from the groove formed in the bore.

* * * * *